Sept. 26, 1950  S. J. HARRIS  2,523,296

TELECINE FLICKER COMPENSATOR

Filed March 27, 1947

INVENTOR
SAMUEL J. HARRIS

BY

ATTORNEY

Patented Sept. 26, 1950

2,523,296

UNITED STATES PATENT OFFICE 2,523,296

TELECINE FLICKER COMPENSATOR

Samuel J. Harris, Fort Wayne, Ind., assignor, by mesne assignments, to Farnsworth Research Corporation, a corporation of Indiana Application March 27, 1947, Serial No. 737,621

13 Claims. (Cl. 178—7.2)

This invention relates to motion picture film projectors and particularly to projectors of this character which are employed in television systems in conjunction with image analyzing tubes wherein optical images are translated into a series of representative video signals.

It is conventional practice to transmit television video signals which are representative of a subject recorded on a strip of motion picture film. Two general types of projectors have been used. The ordinary type of motion picture film projector wherein a strip of film is moved intermittently between a source of light and the photosensitive electrode of a television image analyzing tube has been employed with some measure of success. However, since it is desirable to project the maximum possible amount of light onto the photosensitive electrode the intermittent type of film projector is not entirely satisfactory for most types of image analyzing tubes for the reason that the light is interrupted for a considerable portion of the time.

Consequently, motion picture film projectors of the type wherein the film strip is moved continuously at a uniform rate have been employed with some increase in the amount of light which is projected onto the photosensitive electrode. In order that conventional scanning systems may be used with an image analyzing tube, it is necessary that the optical image which is projected onto the photosensitive electrode be maintained stationary for the time required to scan the electrode or the electron emission therefrom. Accordingly, optical compensating devices have been employed between the film strip and the photosensitive electrode to maintain the optical image on the photosensitive electrode stationary, even though the image is derived from a continuously moving film strip. The most effective type of compensating device is one which includes a light refractive element. Generally, this element consists of a multi-faced prism having a plurality of pairs of oppositely disposed parallel faces which is rotated in such a manner as to compensate for the film movement. The optical compensating element, of course, must be moved synchronously with the moving film.

Good results have been obtained by the use of such apparatus as far as effecting the desired optical compensation for the moving film. However, by virtue of the nature of the refractive compensating element, there is effected a cyclical variation in the average light which is projected onto the photosensitive electrode. The video signals which are derived from an electrode energized in this manner are representative of the cyclical light variation and, consequently, the images which are reproduced from these signals are subject to an undesirable flicker.

In order to eliminate this type of variation in the light which is projected onto the photosensitive element, it has been proposed to introduce in the path of the light beam a filter element. This element is provided with areas of varying light transmitting properties and is moved, such as by rotation, synchronously with the movement of the optical compensating device. When the compensating device is in such a position that a minimum intensity of light is transmitted therethrough, the filter element is in such position that its most transparent area is in the path of the light beam. When the compensating device is in such position that the maximum intensity of light is transmitted therethrough, the filter element presents its least transparent area. By such means the cyclical variation in the average light which is projected onto the photosensitive electrode is practically eliminated. However, the average light which is projected into the electrode is that which corresponds to the lowest intensity of the light transmitted by the compensating device. Consequently, the signal-to-noise ratio of the video signals derived from an image analyzing tube operated in this manner is relatively low. Furthermore, such an element as the light filter does not compensate for random variations in the intensity of the light source which occur by reason of effects such as voltage fluctuations of the power supply for the light source, and the like.

It, therefore, is an object of this invention to provide apparatus for generating video signals representative of a television subject recorded on a continuously moving film strip wherein the video signals do not contain spurious effects representative of variations in the average light of the optical image of the television subject and wherein a relatively high signal-to-noise ratio is maintained.

Another object of the invention is to provide means for generating video signals representative of a television subject recorded on a continuously moving film wherein the video signals are maintained at a substantially constant level which is representative of the average light of an optical image of the television subject, irrespective of any variations which may be present in the instantaneous intensity of the optical image.

Another object of the invention is to provide apparatus for automatically varying the gain of a video signal amplifier in inverse proportion to any variation in the light intensity of the optical image of the television subject caused by any of the optical apparatus except the television subject film.

A still further object of the invention is to provide apparatus for generating video signals reppresentative of a television subject recorded on a continuously moving film and, concurrently, to develop control signal effects respresentative of the instantaneous light intensity, except as modified by the subject film, and to separate the latter type of signals from the video signals so that the control signals may be used to control the gain of a video signal amplifier in inverse proportion to the variations in the average light intensity.

In accordance with this invention, there is provided a television signal transmitting system which includes a motion picture film projector of a character adapted to form a substantially stationary optical image of a continuously moving film. The system also is provided with a means such as an image analyzing tube for translating the optical image into video signals. These video signals are amplified by means suited to such a purpose. In accordance with an important feature of the invention, means are included for developing a control voltage which is representative of any variations in the intensity of the average light derived from the projector. The control voltage is impressed upon the video signal amplifier in a manner to vary the amplifier gain in accordance with the light intensity variations, whereby to maintain substantially constant the level of the amplified video signals irrespective of any variations in the intensity of the average light derived from the projector.

More specifically, the projector includes optical compensating apparatus which may be located between the film and the photoelectric electrode of the image analyzing tube. The compensating device is operated synchronously with the moving film, for the purpose of maintaining substantially stationary the optical image of the moving film which is projected onto the photoelectric electrode. In a particular embodiment of the invention there is provided a film gate past which the film strip is moved; and adjacent to the gate there is provided an aperture which is not in registry with the film. Light from a suitable source is projected through the film gate and that portion of the film strip in registry therewith and also through the auxiliary aperture. The two light beams so formed then pass through the optical compensator so that both beams are subject to the same variations in intensity, caused either by variations in the intensity of the light derived from the source or by variations caused by the operation of the optical compensator. The main beam of light through the film strip is projected onto the photosensitive electrode of the image analyzing tube so that a corresponding electrical image may be produced. The electrical image is scanned in a conventional manner so as to generate video signals respresentative of the television subject. The auxiliary beam of light is projected onto a photosensitive electrode and a voltage derived from this electrode is impressed upon the video signal amplifier as a gain control voltage, whereby to maintain a substantially constant level of the amplified video signals, irrespective of any variations in the video signal voltages derived from the image analyzing tube as a result of undesired variations of the light intensity.

In one form of the invention, a separate phototube may be employed in conjunction with this auxiliary light beam, for the development of the control voltage. In this case the output circuit of the phototube may be coupled to an amplifier in order to develop a gain control voltage of the required magnitude.

In another form of the invention disclosed herein, the image analyzing tube may be provided with a photosensitive electrode of such size that the optical image of the television subject may be projected onto the major portion thereof. At the same time the auxiliary light beam also may be projected onto a small area at one side of the photosensitive electrode. The electrical image formed by means including the electrode is scanned in a conventional manner. As a result, once during each horizontal scansion there will be developed, in addition to the video signals, a signal respresentative of the intensity of the auxiliary light beam. The control signals are separated from the video signals by means such as an amplitude discriminator, for example. The control signals may be amplified separately from the video signals in order to produce a voltage which is impressed upon the video signal amplifier to effect an automatic gain control thereof.

For a better understanding of the invention, together with other and further objects thereof, reference is made to the following description, taken in connection with the accompanying drawing, and its scope will be pointed out in the appended claims.

Figure 1:
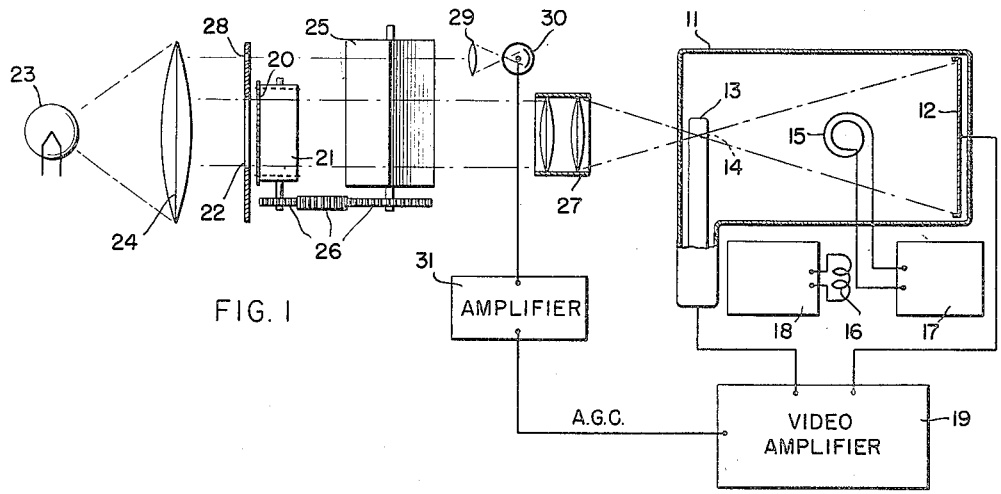
Fig. 1 is a diagrammatic illustration of one form of the invention using an auxiliary phototube.

Having reference now particularly to Fig. 1 of the drawing, there is shown a television image analyzing tube 11 of the image dissector type. The tube is provided with a photosensitive cathode electrode 12 located at one end and adapted to have projected thereon an optical image of the television subject. There also is provided a target electrode 13 located at the other end of the tube. The target electrode is provided with a small scanning aperture 14. Externally of the tube there are provided conventional horizontal and vertical deflecting systems indicated by the coils 15 and 16 which are connected respectively to saw-tooth wave generators 17 and 18. In a well known manner the electron image formed as a result of the cathode electron emission is deflected over the scanning aperture 14 under the control of the deflecting coils 15 and 16. The target electrode 13 may also include a multistage electron multiplier (not shown). The output circuit of the tube between the cathode 12 and the target anode 13 is coupled to a video signal amplifier 19.

The television subject matter is recorded on a motion picture film 20 which is moved continuously at a uniform rate by means such as a sprocket wheel 21 which is driven by suitable means (not shown) past a film gate 22. A source of light 23 also is provided so that, by means of a suitable condenser lens system 24, a beam of light is directed through the film gate and that portion of the film in registry therewith. There also is located between the film 20 and the cathode 12 of the image analyzing tube an optical compensating device 25. This device may consist of a multi-faced prism as indicated. The prism is rotated in synchronism with the moving film by any suitable means such as a gear train 26 linking the prismatic compensator and the sprocket wheel 21. In addition, there is mounted a projecting lens system 27 between the optical compensator and the image analyzing tube for the purpose of projecting a substantially stationary optical image onto the cathode 12.

In accordance with a feature of the present invention, there is provided an aperture 28 which may be in the form of a slit extending alongside of the film gate 22 in the direction of the film movement. The condensing lens system 24 is of such a character that light derived from the source 23 is projected through the aperture 28 so that it may pass through a section of the compensator 25. The auxiliary light beam so produced is projected by another lens system 29 onto an auxiliary phototube 30. The output of the phototube is coupled to an amplifier 31, the output circuit of which is coupled to the video amplifier 19 in a conventional manner to effect a control of the gain or amplification factor of this amplifier.

With reference now to the operation of the embodiment of the invention shown in Fig. 1, consideration will first be given to the functioning of the projection apparatus in the formation of an optical image on the cathode 12 of the image analyzing tube. The film 20 is assumed to be moving at a uniform rate past the film gate 22 in a downward direction normal to the plane of the drawing. At the same time the compensator 25 is rotating so that the prism faces on the film side of the device also are moving in a downward direction. As is well known in the art, this type of apparatus effects a compensation for the film movement, whereby the optical image which is projected onto the photosensitive cathode is held substantially stationary. The electrical or electron image which is produced as a result of the cathode electron emission is deflected by the coils 15 and 16 in a conventional manner over the scanning aperture 14, whereby to develop a series of video signals representative of the television subject. These signals are amplified in a conventional manner by the video signal amplifier.

However, by virtue of the changing angular relationship of the prism faces relative to the light coming through the film 20, there is effected a variation in the average intensity of the optical image which is projected onto the cathode 12. Consequently, the electron image which is produced is subject to a corresponding variation in intensity so that the video signals which are developed and amplified have a representative intensity variation.

According to this invention an auxiliary beam of light coming through the aperture 28 is acted upon by the optical compensator 25 and consequently is subject to the same cyclical intensity variation as the picture-modulated light which comes through the film 20. The auxiliary beam of light is not modulated in any other manner. The projection of the auxiliary beam of light onto the phototube 30 produces a voltage which has a cyclical variation in magnitude corresponding to the light intensity variation. After suitable amplification of this voltage by the amplifier 31, its impression upon the video amplifier 19 effects a gain control of this amplifier to compensate for the undesired variation of the video signals. Specifically, when the video signals represent a maximum intensity of light, the gain of the video amplifier is reduced. Conversely, when the compensator 25 is in the position to project light of minimum intensity onto the cathode 12, the gain of the video amplifier 19 is increased by means of the voltage derived from the phototube 30. By suitable adjustment of components in a manner well known in the art, the video amplifier gain may be varied suitably to completely compensate for the video signal voltage variations produced by the varying intensity of the average light projected onto the cathode of the image analyzing tube.

Figure 2:
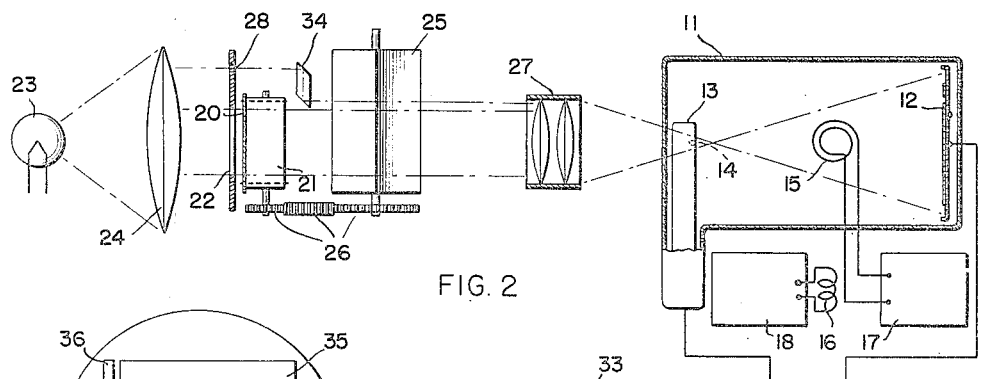
Fig. 2 is a diagrammatic illustration of another form of the invention employing the photosensitive electrode of the image analyzing tube for the development of the gain control voltage.

Referring now to Fig. 2, another embodiment of the invention which does not require the use of an auxiliary phototube is shown. The image analyzing tube 11 may be identical to that shown in Fig. 1.

The output circuit connections for the tube, however, are slightly different. The cathode 12 and the target anode structure 13 are coupled to a signal separator 32. This apparatus may be conventional for the purpose of separating the video signals from the signals developed by scanning the electron image for use as an automatic gain control. The output circuit of the signal separator in which are developed the signals to be converted into an automatic gain control voltage is coupled to an amplifier 33. Inasmuch as the generated gain control signals consist of a series of impulses, it will be necessary that the amplifier 33 be provided with suitable filtering facilities to develop a substantially continuous gain control voltage. The output circuit of the signal separator 32, in which are developed the video signals, is coupled to the video signal amplifier 19. Finally, the output circuit of the gain control signal amplifier 33 is coupled to the video amplifier in a manner to vary the amplification factor thereof in accordance with the gain control signals.

Figure 3:
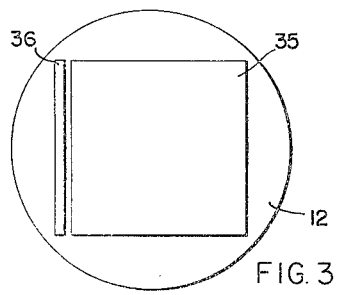
Fig. 3 is a face view of the photoelectric electrode of Fig. 2.

Also, the apparatus for projecting a compensated optical image of the continuously moving film 20 upon the photosensitive cathode 12 may be similar to that shown in the embodiment of Fig. 1. This apparatus may also include an auxiliary aperture 28 as in the previously described form of the invention. However, in this case the projecting apparatus also includes a reflecting prism 34 located between the auxiliary aperture 28 and the optical compensator 25. The prism may have the same general form as that illustrated wherein one angularly disposed reflecting face thereof is in alignment with the aperture 28 so as to reflect the auxiliary beam of light normally toward a second reflecting face disposed angularly to the axis of the system and in alignment with a section of the compensator 25 closely adjacent to one edge of the section employed for the compensation of the light emerging from the film 20. The auxiliary beam of light may be projected by the lens system 29 onto the photosensitive cathode 12 so that it lies closely adjacent to the optical image projected onto the cathode from the film. This relationship is shown more in detail in Fig. 3. The larger portion of the cathode has projected thereon an optical image 35 of the film. Alongside of one vertical edge of the film image 35 there is projected an optical image 36 of the auxiliary light beam.

In the operation of the apparatus shown in Fig. 2 there is produced a composite electron image which consists of an area corresponding to the optical image 35 and a relatively small area corresponding to the optical image 36 in the same relative positions as they appear on the cathode. The scansion of the composite electron image over the aperture 14 by means of the deflecting system produces a signal representative of the auxiliary optical image 36 once during each horizontal scanning line. Inasmuch as the auxiliary optical image 36 is located at one edge of the main optical image 35, the scansion of the auxiliary portion of the electron image may be made to coincide with the usual blanking interval between scansions of successive horizontal lines of the main electron image.

Figure 4:
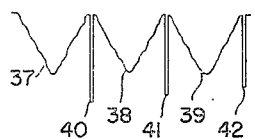
Fig. 4 is a curve showing the wave form of typical signals derived from the image analyzing tube of Fig. 2.

The video signals which are derived from the image analyzing tube will have the general form shown in Fig. 4. The wave portions 37, 38 and 39 represent the video signals generated by scanning successive horizontal lines of the main electron image corresponding to the optical image 35. The wave portions 40, 41 and 42 are generated by the successive scansions of the auxiliary electron image corresponding to the optical image 36. As illustrated, the wave portions 40, 41 and 42 are of progressively decreasing magnitudes. This illustrates a decreasing intensity of the optical image 36 as succeeding horizontal lines of the electron image is scanned. The light intensity changes cyclically by reason of the inherent property of the compensator 25 as described, while the electron image of a given film frame is being scanned. During scansion, the average light intensity of the main optical image 35 undergoes the same cyclical variation in intensity as the optical image 36. Consequently, the relative amplitudes of the video signal wave portions 37, 38 and 39 have substantially the same decreasing average amplitudes as the wave portions 40, 41 and 42.

The signals, such as those illustrated in Fig. 4, which are derived from the analyzing tube 11 are impressed upon a signal separator 32 which may be apparatus that is entirely conventional for the purpose of signal separation and of which there are many examples in the television art. The signal separation may be on the basis of amplitude discrimination, for example. In such a case the signal separator may include apparatus similar to a clipper or limiter whereby there is derived therefrom only those parts of the wave portions 40, 41 and 42 of Fig. 4 which exceed a predetermined level beyond the range of the video signal wave portions 37, 38 and 39. These clipped signals when applied to the amplifier 33 and suitably filtered because of the impulsive nature of the signals produce an automatic gain control voltage which may be applied to the video amplifier 19 to vary its amplification factor suitably in inverse ratio to the cyclical variation of the average video signal amplitudes. The composite video and gain control signals derived from the image analyzing tube 11 may, if desired, be impressed upon the video amplifier 19, either before or after signal separation. In either case the auxiliary gain control signals may be eliminated from the video signals before the transmitter is modulated, for the reason that the gain control signals occur during the blanking intervals.

It may be seen from the foregoing description of two illustrative embodiments of the invention that it provides a means for compensating the variations in intensity of the optical image irrespective of whether these variations occur by reason of the inherent functioning of the optical compensating device or by random variations in the intensity of the light source.

The two illustrative embodiments of the invention disclosed herein have the advantage that a compensation may be made for practically any variation in the average intensity of the optical image projected onto the photosensitive electrode of an image analyzing tube, whether the variation is due to the operation of the optical compensator, or is caused by reason of a variation in the light derived from the source. In the case of a variation resulting from the operation of the optical compensator, it will be periodic in nature. In the case of a variation in the intensity of the light derived from the source, it generally will not be periodic, but on the contrary will be random in time. This type of variation may result from the operation of the light source itself, or it may be the result of a variation in the voltage employed to energize the light source. It is apparent from the foregoing description that both types of light intensity variations may be compensated by the two embodiments of the invention disclosed.

However, in accordance with the broad teaching of the present invention to the effect that a voltage developed as representative of a variation in the average light intensity is employed to vary the gain of a video signal amplifier so as to maintain the level of the amplified video signal substantially constant, other forms of the invention may be used. For example, since the variation in light intensity produced by the optical compensator is the chief cause of signal distortion, a gain control voltage representative of the variation may be independently developed and impressed upon the video amplifier in synchronism with the actual light intensity variation. For this purpose there may be employed a signal generator, which preferably is electronic, to develop such a cyclically varying gain control voltage. Synchronism between such a voltage and the video signals may be maintained in a conventional manner well known to those versed in the television art.

Alternatively, there may be registered the cyclical variation in light intensity produced by the operation of the optical compensator and the registered variation may be employed to develop a suitable gain control voltage. The light intensity variations may be registered, for example, by recording these variations on a separate relatively short strip of film. Inasmuch as these variations recur, at a known periodicity, the recording may be used continuously to develop the desired gain control voltage. Here again it is necessary to operate the record, or other registration of the light intensity variation, in synchronism with the actual variations produced by the operation of the optical compensator.

It is contemplated that such alternative arrangements be considered as falling within the scope of the present invention as defined in the broad claims. It is desired to be understood that the present invention teaches the general principle of developing a gain control voltage which varies in magnitude in accordance with variations in the average light intensity of an optical image representing a television subject and using such a voltage to vary the gain of a video signal amplifier synchronously with the variations in light intensity.

While there has been described what, at present, is considered the preferred embodiment of the invention, it will be obvious to those skilled in the art that various changes and modifications may be made therein without departing from the invention, and it, therefore, is aimed in the appended claims to cover all such changes and modifications as fall within the true spirit and scope of the invention.

What is claimed is:

1. A television signal transmitting system comprising, a motion picture film projector adapted to form a substantially stationary optical image of a continuously moving film, said projector including an optical compensator moving synchronously with said film to compensate for said film movement, means for translating said optical image into video signals, means for amplifying said video signals, a signal generator responsive to variations in the intensity of the light derived from said projector for producing control signals representative of said variations, and means for impressing said control signals upon said video signal amplifying means for varying the gain of said video signal amplifying means in accordance with said light intensity variations.

2. A television signal transmitting system comprising, a motion picture film projector adapted to form a substantially stationary optical image of a continuously moving film, said projector including an optical compensator moving synchronously with said film to compensate for said film movement, means for directing a beam of light not modulated by said film through said compensator, photoelectric means for translating said optical image into video signals and for converting said beam of light into control signals, means for amplifying said video signals, and means employing said control signals for varying the gain of said video signal amplifying means in accordance with variations in the intensity of light derived from said projector.

3. A television signal transmitting system comprising, an image analyzing tube for translating an optical image of a television subject into video signals, a continuously moving motion picture film constituting said television subject, a light projector for projecting an optical image of said film onto said image analyzing tube, said projector including an optical compensator operated synchronously with said film to compensate for the movement of said film, whereby to maintain said optical image substantially stationary, photoelectric means for converting light derived from said projector into a series of control signals representative of any variations in the intensity of said light produced independently of said film, a video signal amplifier coupled to said image analyzing tube, and means for impressing said control signals upon said amplifier to vary its gain automatically in accordance with any of said light intensity variations.

4. A television signal transmitting system comprising, an image analyzing tube for translating an optical image of a television subject into video signals, a continuously moving motion picture film constituting said television subject, a light projector including an optical compensator operated synchronously with said film, said projector being adapted to project a main beam of light through said film and an auxiliary beam of light adjacent to said film, both of said beams being projected through said compensator, said compensator serving to maintain said optical image substantially stationary, photoelectric means for converting said auxiliary beam of light into a series of control signals representative of any variations in the intensity of said light produced by the operation of said compensator, means coupled to said image analyzing tube for amplifying video signals derived from said tube, and means employing said control signals to vary the gain of said amplifying means automatically in accordance with said light intensity variations.

5. A television signal transmitting system comprising, a motion picture film projector adapted to form a substantially stationary optical image of a continuously moving film, said projector including an optical compensator moving synchronously with said film to compensate for said film movement, means for directing a beam of light not modulated by said film through said compensator, means including an image analyzing tube for translating said optical image into video signals, means including a phototube for translating said beam of light into control signals, means for amplifying said video signals, and means employing said control signals for varying the gain of said video signal amplifying means in accordance with variations in the intensity of light derived from said projector.

6. A television signal transmitting system comprising, an image analyzing tube including a photosensitive electrode for translating an optical image of a television subject into video signals, a continuously moving motion picture film, a refractive optical compensating device located between said film and said electrode and operated synchronously with said film to compensate for the movement of said film, whereby to maintain a substantially stationary optical image on said electrode, means for projecting a beam of light through said film and said compensator to produce said optical image on said electrode, a video signal amplifier coupled to said image analyzing tube, a photosensitive device, means for projecting another beam of light through said compensator onto said photosensitive device to generate control signals representative of the light intensity of the optical image of said television subject, and means coupling said photosensitive device to said video amplifier to vary the gain of said amplifier.

7. A television signal transmitting system comprising, an image analyzing tube for translating an optical image of a television subject into video signals, a photosensitive electrode in said tube upon which said optical image is adapted to be projected, whereby to enable the formation of a corresponding electrical image, a continuously moving motion picture film, means for projecting a first beam of light through a portion of said film, a multi-faced prism rotating synchronously with said film and located in the path of said first light beam emerging from said film, said prism serving to compensate for the movement of said film, whereby to maintain said optical image substantially stationary on said electrode, a photosensitive device, means for projecting a second beam of light through said prism onto said photosensitive device, means for converting said electrical image into a train of video signals representative of said television subject, means including an amplifier coupled to said image analyzing tube for amplifying said video signals, and means coupling said video signal amplifier and said photosensitive device for varying the gain of said amplifier to compensate for variations in the light intensity of said optical image of the television subject.

8. A television signal transmitting system comprising, an image analyzing tube for translating an optical image of a television subject into video signals, a photosensitive electrode in said tube upon which said optical image is adapted to be projected, whereby to enable the formation of a corresponding electrical image, a continuously moving motion picture film, a source of light, a film gate located between said light source and said film, means for projecting a main beam of light from said source through said gate and that portion of said film in registry with the gate, a multi-faced prism rotated synchronously with said film and located between said film and said electrode to compensate for the movement of said film, whereby to maintain said optical image substantially stationary on said electrode, an elongated aperture located adjacent to said film gate along an edge thereof corresponding to the direction of said film movement, means for projecting an auxiliary beam of light from said source through said aperture and said compensating prism, a photosensitive device, optical means located between said compensating prism and said photosensitive device for projecting said auxiliary beam of light onto said device, a deflecting system for said image analyzing tube to scan said electrical image, whereby to generate a series of video signals representative of said television subject, a video signal amplifier coupled to said image analyzing tube, a control signal amplifier coupled to said photosensitive device, and means coupling the output of said control signal amplifier to said video signal amplifier for varying the gain of said video signal amplifier to compensate for variations in the light intensity of said optical image of the television subject.

9. A television signal transmitting system comprising, a motion picture film projector adapted to form a substantially stationary optical image of a continuously moving film, said projector including a refractive optical compensating device moving synchronously with said film to compensate for said film movement, means for directing a beam of light not modulated by said film through said optical compensating device, an image analyzing tube for translating said optical image into video signals and including a photosensitive member upon which said optical image is adapted to be projected by said film projector, a video signal amplifier coupled to said image analyzing tube, means coupled to said tube for deriving control signals representative of the intensity of the unmodulated beam of light, and means coupled to said video amplifier utilizing said control signals for varying the gain of said video signal amplifier in accordance with variations in the intensity of the light derived from said film projector.

10. A television signal transmitting system comprising an image analyzing tube for translating an optical image of a television subject onto video signals, said tube having a photosensitive electrode serving to translate light energy into electrical energy, a projector for a continuously moving motion picture film for directing light onto said electrode representative of an optical image of said film, said projector including an optical compensator moving synchronously with said film for maintaining said optical image substantially stationary on said electrode, means for directing an auxiliary beam of light through said optical compensator and onto said electrode, means for scanning the electrical energy produced by said electrode whereby to generate a train of viedo signals representative of the subject matter of said film and a train of control signals representative of the variations in intensity of said light beams, a video signal amplifier coupled to said image analyzing tube, and means for impressing said control signals upon said video amplifier to vary the gain of said amplifier in accordance with said variations in intensity of said light beams.

11. A television signal transmitting system comprising, an image analyzing tube for translating an optical image of a television subject into video signals, a photosensitive electrode in said tube upon which said optical image is adapted to be projected, a continuously moving motion picture film, a multi-faced prism rotated synchronously with said film and located between said film and said electrode to compensate for the movement of said film, means for projecting a main beam of light through said film and said compensating prism and onto said electrode, means for projecting an auxiliary beam of light through said compensating prism and onto said electrode, the projection of said light beams upon said electrode enabling the formation of corresponding electrical images, means for concurrently scanning said electrical images whereby to generate a composite signal consisting of alternate trains of video signals and control signals, means for separating the generated video and control signals, a video signal amplifier coupled to said signal separating means, a control signal amplifier coupled to said signal separating means, and means coupling said control signal amplifier to said video amplifier to control the gain of said video amplifier in accordance with variations in the intensity of said main light beam.

12. A television signal transmitting system comprising, an image analyzing tube for translating an optical image of a television subject into video signals, a photosensitive electrode in said tube upon which said optical image is adapted to be projected, whereby to enable the formation of a corresponding electrical image, a continuously moving motion picture film, a source of light, means for projecting light from said source through said film to produce a main optical image upon said electrode representing the subject matter of said film, a multi-faced prism located between said film and said electrode and adapted to be rotated synchronously with said film to compensate for said film movement, whereby to maintain said main optical image substantially stationary on said electrode, means for projecting light from said source through said prism to produce an auxiliary optical image upon said electrode representing the instantaneous light intensity of said main optical image, said auxiliary optical image being produced in an area adjacent to said main optical image, a deflecting system for said tube to scan the electrical images corresponding to said optical images in successive elemental areas, whereby to generate a composite signal consisting of alternate video signals representing one line of elemental areas of said main image and control signals representing the light values of said auxiliary image, a signal separator coupled to said image analyzing tube to recover said control signals, a control signal amplifier coupled to said signal separator, a video signal amplifier coupled to said signal separator, and means coupling the output of said control signal amplifier to said video amplifier for varying the gain of said video amplifier in inverse proportion to the magnitude of said control signals.

13. A television signal transmitting system comprising, an image analyzing tube for translating an optical image of a television subject into video signals, a photosensitive electrode in said tube upon which said optical image is adapted to be projected for the formation of a corresponding electrical image, a continuously moving motion picture film, a source of light, a film gate located between said light source and said film, means for projecting light from said source through that portion of said film in registry with said gate to form a main film-modulated light beam, a multi-faced prism adapted for rotation synchronously with said film and mounted between said film and said electrode to compensate for said film movement, whereby to maintain said optical image substantially stationary on said electrode, a narrow elongated aperture located adjacent to said film gate along one edge thereof corresponding to the direction of said film movement, means for projecting light from said source through said aperture to form an auxiliary light beam, an elongated double reflection prism located between said aperture and said compensating prism to direct said auxiliary light beam through said compensating prism in a section thereof closely adjacent to that through which the film-modulated light beam is projected, whereby to project an optical image of said aperture onto said photosensitive electrode in an area closely adjacent to the projected optical image of said film, means for scanning the composite electrical image produced by said two optical images, whereby to generate a composite signal consisting of alternate trains of video signals representing successive horizontal lines of the electrical image of said television subject and control signals representing the electrical image of said elongated aperture, means for recovering said control signals from said composite signal, a video signal amplifier, means for impressing said video signals upon said amplifier, and means utilizing said recovered control signals for varying the gain of said video signal amplifier in accordance with instantaneous variations in the intensity of said optical images on said photosensitive electrode.

SAMUEL J. HARRIS.

REFERENCES CITED

The following references are of record in the file of this patent:

UNITED STATES PATENTS

| Number | Name | Date |
|---|---|---|
| 2,084,700 | Ogloblinksy | June 22, 1937 |
| 2,134,851 | Blumlein | Nov. 1, 1938 |
| 2,199,608 | Barthelemy | May 7, 1940 |
| 2,310,285 | Hanson | Feb. 9, 1943 |
| 2,337,234 | Eaton | Dec. 21, 1943 |
| 2,344,695 | Goldsmith | Mar. 21, 1944 |

FOREIGN PATENTS

| Number | Country | Date |
|---|---|---|
| 102,647 | Australia | Dec. 16, 1937 |